(12) United States Patent
Galindo et al.

(10) Patent No.: US 11,489,319 B2
(45) Date of Patent: *Nov. 1, 2022

(54) METHOD FOR INSTALLING A PULLING HEAD ASSEMBLY

(71) Applicant: Southwire Company, LLC, Carrollton, GA (US)

(72) Inventors: Juan Galindo, Powder Springs, GA (US); Jeremy Harris, Villa Rica, GA (US); Frank Calhoun, Carrollton, GA (US)

(73) Assignee: Southwire Company, LLC, Carrollton, GA (US)

( * ) Notice: Subject to any disclaimer, the term of this patent is extended or adjusted under 35 U.S.C. 154(b) by 88 days.

This patent is subject to a terminal disclaimer.

(21) Appl. No.: 16/888,806

(22) Filed: May 31, 2020

(65) Prior Publication Data

US 2020/0295544 A1 Sep. 17, 2020

Related U.S. Application Data

(60) Continuation of application No. 15/722,797, filed on Oct. 2, 2017, now Pat. No. 10,673,214, which is a
(Continued)

(51) Int. Cl.
*H01R 43/04* (2006.01)
*H02G 1/08* (2006.01)
(Continued)

(52) U.S. Cl.
CPC .............. *H02G 1/081* (2013.01); *B23P 23/00* (2013.01); *B25H 1/0078* (2013.01); *B25H 1/08* (2013.01);
(Continued)

(58) Field of Classification Search
CPC ....... Y10T 83/04; Y10T 83/76; B25H 1/0078; B25H 1/08; H01R 43/0484; H01R 43/05; H01R 43/058; H02G 1/081
See application file for complete search history.

(56) References Cited

U.S. PATENT DOCUMENTS 344,362 A 6/1886 Eilers
1,649,937 A 11/1927 Waltz
(Continued)

OTHER PUBLICATIONS

International Search Report dated Dec. 9, 2010 in International Application No. PCT/US10/052434.
(Continued)

*Primary Examiner* — Paul D Kim
(74) *Attorney, Agent, or Firm* — Hartman & Citrin LLC

(57) ABSTRACT

A workstation and method for the installation of a pulling head assembly onto one or more conductors of a cabling system are provided. The workstation incorporates one or more of: a conductor clamp that holds the conductors of the cabling system in place during the installation of the pulling head assembly; a cutting guide having indicia marks that indicate the lengths to which to cut the conductors in order to achieve a staggered pattern of pulling eyes attached to the conductors in the pulling head assembly; a stripping tool that is used to remove a portion of the insulation from the terminal end of each conductor so that the end of the conductor may be inserted into the pulling eye; and a crimping tool that is used to crimp the pulling eyes onto the terminal ends of each of the conductors.

14 Claims, 7 Drawing Sheets

Related U.S. Application Data continuation of application No. 14/068,671, filed on Oct. 31, 2013, now Pat. No. 9,780,542, which is a division of application No. 12/579,075, filed on Oct. 14, 2009, now Pat. No. 9,484,722.

(51) Int. Cl.

| | | |
|---|---|---|
| *H01R 43/05* | (2006.01) | |
| *H01R 43/048* | (2006.01) | |
| *B25H 1/08* | (2006.01) | |
| *B25H 1/00* | (2006.01) | |
| *B23P 23/00* | (2006.01) | |
| *H01R 43/058* | (2006.01) | |

(52) U.S. Cl.
CPC ......... *H01R 43/0484* (2013.01); *H01R 43/05* (2013.01); *H01R 43/058* (2013.01); *Y10T 29/49181* (2015.01); *Y10T 29/49826* (2015.01); *Y10T 29/49933* (2015.01); *Y10T 29/514* (2015.01); *Y10T 29/5145* (2015.01); *Y10T 29/5177* (2015.01); *Y10T 29/5187* (2015.01); *Y10T 29/5193* (2015.01); *Y10T 29/53226* (2015.01); *Y10T 29/53235* (2015.01); *Y10T 29/53265* (2015.01); *Y10T 29/53961* (2015.01); *Y10T 83/04* (2015.04); *Y10T 83/76* (2015.04)

(56) References Cited

U.S. PATENT DOCUMENTS

| | | | |
|---|---|---|---|
| 1,677,968 | A | 7/1928 | Hughes |
| 2,340,360 | A | 2/1944 | Alden |
| 2,485,274 | A | 10/1949 | Garrett |
| 3,599,800 | A | 8/1971 | Durante |
| 3,664,031 | A | 5/1972 | Duffy |
| 3,909,900 | A | 10/1975 | Gudmestad |
| 3,930,293 | A | 1/1976 | Girard |
| 4,243,864 | A | 1/1981 | Vieau |
| 4,261,230 | A | 4/1981 | Sindelar |
| 4,361,942 | A | 12/1982 | Mazzola et al. |
| 4,428,115 | A | 1/1984 | Campbell et al. |
| 4,490,084 | A | 12/1984 | Collier |
| 4,551,893 | A | 11/1985 | Ikeda et al. |
| 4,663,822 | A | 5/1987 | Blaha et al. |
| 4,779,781 | A | 10/1988 | Billberg et al. |
| 5,013,125 | A | 5/1991 | Nilsson et al. |
| 5,039,196 | A * | 8/1991 | Nilsson ................ G02B 6/4465 385/136 |
| 5,501,549 | A | 3/1996 | Breda |
| 5,709,027 | A | 1/1998 | Kato et al. |
| 5,943,751 | A | 8/1999 | Kamei |
| 6,220,074 | B1 | 4/2001 | Montminy et al. |
| 6,397,654 | B1 | 6/2002 | Moeser |
| 6,418,768 | B2 | 7/2002 | Meisser |
| 6,487,885 | B2 | 12/2002 | Meisser |
| 6,675,458 | B1 | 1/2004 | Davidson et al. |
| 7,096,760 | B2 | 8/2006 | Schmode |
| 7,266,877 | B2 | 9/2007 | Pittau |
| 7,305,749 | B2 | 12/2007 | Kramer |
| 7,305,758 | B2 | 12/2007 | Kurooka et al. |
| 8,480,050 | B2 | 7/2013 | Chiasson et al. |
| 8,800,967 | B2 | 8/2014 | Carlson |
| 8,844,905 | B2 | 9/2014 | Carlson |
| 9,142,942 | B2 | 9/2015 | Simmons et al. |
| 2006/0148277 | A1 | 7/2006 | Pittau et al. |
| 2007/0251516 | A1 | 11/2007 | Nieber |
| 2007/0261228 | A1 | 11/2007 | Locher et al. |
| 2010/0236045 | A1 | 9/2010 | Galindo |
| 2011/0133141 | A1 * | 6/2011 | Carlson ................ B65H 55/005 254/134.3 R |
| 2013/0218325 | A1 * | 8/2013 | Carlson .................. B65H 54/00 700/213 |
| 2013/0221298 | A1 | 8/2013 | Bennett |
| 2014/0109388 | A1 | 4/2014 | Henderson |

OTHER PUBLICATIONS

Panama Official Action dated Feb. 3, 2012 in Panama Application No. 88973-01.
Office Action dated Sep. 19, 2013, in U.S. Appl. No. 12/579,075.
Correspondence from Examiner dated Aug. 19, 2013, in U.S. Appl. No. 12/579,075.
Office Action dated Mar. 20, 2014, in U.S. Appl. No. 12/579,075.
Office Action dated Aug. 8, 2014, in U.S. Appl. No. 12/579,075.
Office Action dated Feb. 9, 2015 in U.S. Appl. No. 12/579,075.
Office Action dated Jul. 13, 2015 in U.S. Appl. No. 12/579,075.
U.S. Notice of Allowance dated Jun. 15, 2016 in U.S. Appl. No. 12/579,075.
Office Action dated Jul. 4, 2017 issued in Canadian Patent Application No. 2,774,428.
U.S. Office Action dated Aug. 31, 2015 in U.S. Appl. No. 14/068,671.
U.S. Office Action dated Feb. 2, 2016 in U.S. Appl. No. 14/068,671.
U.S. Office Action dated Dec. 1, 2016 in U.S. Appl. No. 14/068,671.
U.S. Notice of Allowance dated May 11, 2017 in U.S. Appl. No. 14/068,671.
U.S. Notice of Allowance dated Jul. 12, 2017 in U.S. Appl. No. 14/068,671.
U.S. Notice of Allowance dated Aug. 18, 2017 in U.S. Appl. No. 14/068,671.
U.S. Office Action dated Aug. 5, 2019 in U.S. Appl. No. 15/722,797.
U.S. Notice of Allowance dated Jan. 27, 2020 in U.S. Appl. No. 15/722,797.

* cited by examiner

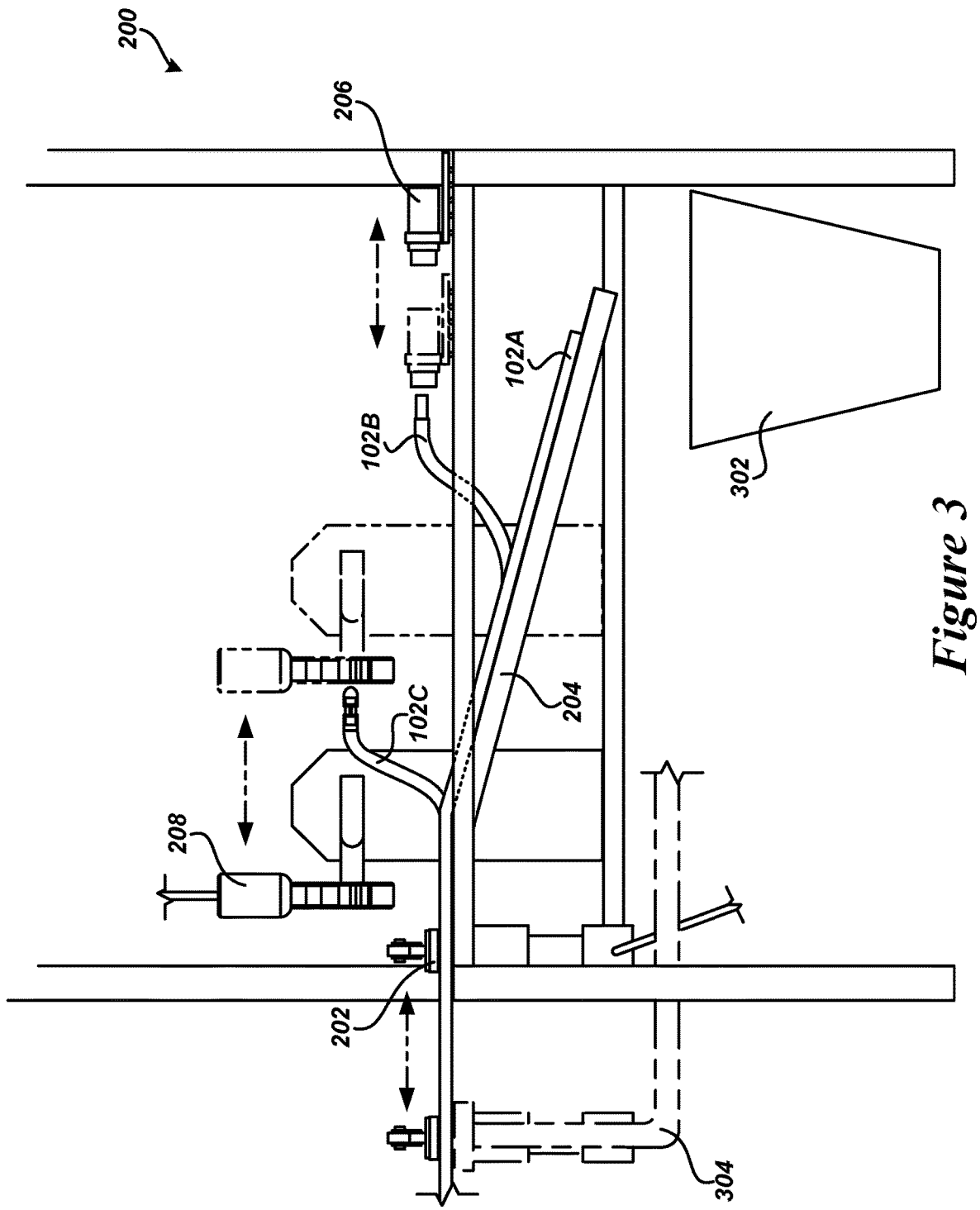

METHOD FOR INSTALLING A PULLING HEAD ASSEMBLY

CROSS-REFERENCE TO RELATED APPLICATION

This application is a continuation of and claims priority to U.S. patent application Ser. No. 15/722,797, filed Oct. 2, 2017, entitled "Method for Installing a Pulling Head Assembly," now U.S. Pat. No. 10,673,214, which is expressly incorporated herein by reference in its entirety and which is a continuation of and claims priority to U.S. patent application Ser. No. 14/068,671, filed Oct. 31, 2013, entitled "A Method for Installing a Pulling Head Assembly," now U.S. Pat. No. 9,780,542, which is expressly incorporated herein by reference in its entirety and which is a division of and claims priority to U.S. patent application Ser. No. 12/579,075, filed Oct. 14, 2009, entitled "Pulling Head Assembly Workstation," now U.S. Pat. No. 9,484,722, which is expressly incorporated herein by reference in its entirety and which is related to U.S. Provisional Patent Application No. 61/162,589 filed on Mar. 23, 2009, entitled "Integrated Systems for Wire and Cable Installations," U.S. Provisional Patent Application No. 61/174,210 filed on Apr. 30, 2009, entitled "Integrated Systems for Wire and Cable Installations," U.S. Provisional Patent Application No. 61/221,216 filed on Jun. 29, 2009, entitled "Integrated Systems for Wire and Cable Installations," and U.S. Provisional Patent Application No. 61/244,919 filed on Sep. 23, 2009, entitled "Layered Reel and Layering Multiple Parallels on a Single Reel," all of which are expressly incorporated herein by reference in their entireties.

BACKGROUND

Multiple conductor cabling consisting of multiple, independent wires or conductors are an integral part of many systems, including electrical and power systems. Such cabling may be installed by pulling the independent conductors in parallel through pipe or conduit over long distances. A pulling rope running through the conduit is attached to each conductor, and the rope is pulled through the conduit, drawing the multiple conductor cabling from spools or other delivery mechanism and through the conduit. The amount of force required to pull several conductors through a lengthy conduit, potentially with many bends or turns, may be substantial, and if the force is applied to the cabling improperly, one or more conductors may be damaged during the pull. Such damage may hamper performance of the multiple conductor cabling or present safety issues. In addition, finding and repairing the damaged portions of the conductors may be prohibitively expensive or physically impossible, and may necessitate replacement of the entire cabling.

The conductors may be attached to the pulling rope through a pulling head. Traditionally, pulling heads are created for a given pull on an ad hoc basis at the jobsite. This procedure adds time and expense to the installation of the cabling and requires the installers have the tools and skills necessary for creation of the pulling heads. These ad hoc created pulling heads may also lead to damaged conductors during the pull.

It is with respect to these considerations and others that the disclosure made herein is presented

SUMMARY

It should be appreciated that this Summary is provided to introduce a selection of concepts in a simplified form that are further described below in the Detailed Description. This Summary is not intended for use in limiting the scope of the claimed subject matter.

Apparatus and methods are described herein for the installation of a pulling head assembly on one or more conductors of a cabling system. According to one embodiment, a workstation for the installation of the pulling head assembly may incorporate a conductor clamp that holds the conductors of the cabling system in place during the installation of the pulling head assembly. The workstation may also incorporate a cutting guide having indicia marks that indicate the lengths to which to cut the conductors in order to achieve a staggered pattern of pulling eyes attached to the conductors in the pulling head assembly. The workstation may also incorporate a stripping tool that is used to remove a portion of the insulation from the terminal end of each conductor so that the end of the conductor may be inserted into the pulling eye. The workstation may also incorporate a crimping tool that is used to crimp the pulling eyes onto the terminal ends of each of the conductors.

According to another embodiment, a method for installing a pulling head assembly onto one or more conductors includes feeding the conductors into a cutting guide of a pulling head assembly workstation and engaging a conductor clamp attached to the workstation to hold the conductors in place during the installation. Each of the conductors is cut to an appropriate length for the pulling head assembly, and then a stripping tool incorporated into the workstation is used to remove a portion of insulation from the terminal end of each of the conductors. Finally, a crimping tool incorporated into the workstation is used to crimp the pulling eyes of the pulling head assembly onto the terminal ends of the conductors.

Other apparatus, systems, and methods according to embodiments will be or become apparent to one with skill in the art upon review of the following drawings and Detailed Description. It is intended that all such additional apparatus, systems, and/or methods be included within this description, be within the scope of the present invention, and be protected by the accompanying claims.

BRIEF DESCRIPTION OF THE DRAWINGS

FIG. 3 is a side view of the pulling head assembly workstation showing details of the tools and components incorporated thereon, according to various embodiments presented herein;

DETAILED DESCRIPTION

Figure 1:
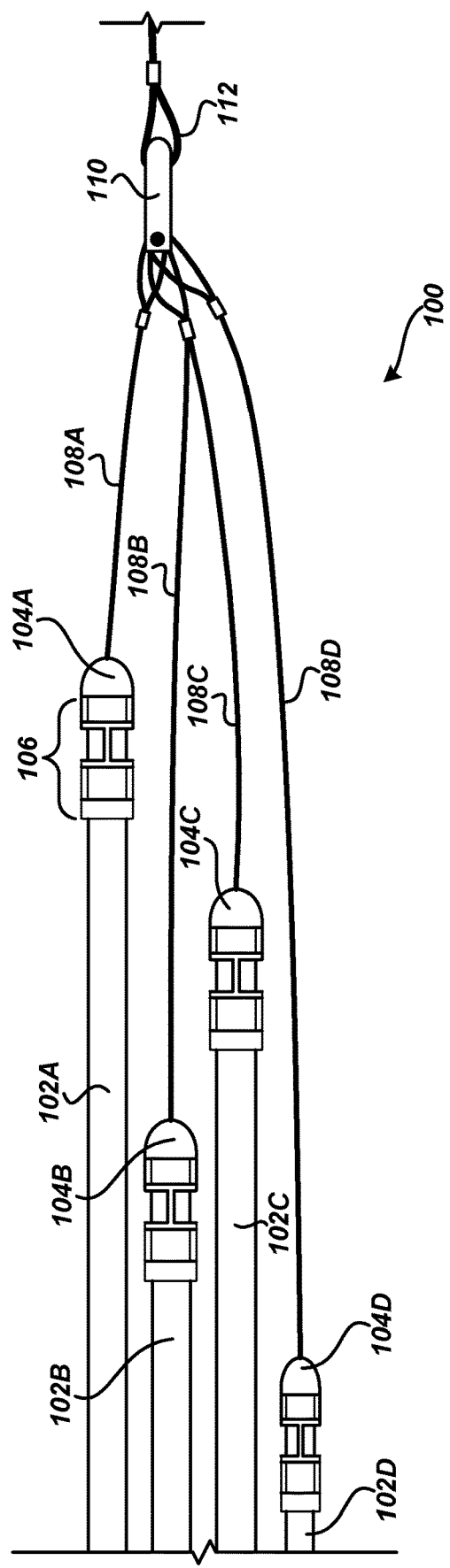
FIG. 1 is a diagram showing an exemplary pulling head assembly installed on multiple conductor cabling, according to various embodiments presented herein.

The following detailed description is directed to a workstation for the installation of pulling head assemblies on multiple conductor cabling and a method for using the same. As discussed briefly above, pulling heads for pulling multi-conductor cabling through conduits are typically created for a given pull at the jobsite. This procedure adds time and expense to the installation of the cabling and requires the installers have the tools and skills for necessary creation of the pulling heads. These ad hoc created pulling heads may also lead to damaged conductors during the pull.

In contrast, multiple conductor cabling may be delivered from the manufacturer of the cabling system with a pulling head assembly already installed. Pulling head assemblies installed by the manufacturer may provide a more standardized and reliable connection of the pulling head to the conductors. Moreover, engineering techniques and quality control processes in place at the manufacturer's facilities may overcome the variability and deviations typically experienced with ad hoc installations done at the jobsite. Manufacturer installed pulling head assemblies may reduce setup time, pulling time, and cleanup time, as well as reducing the risk of damage to the conductors during installation. To accomplish this, the manufacturer may require implementation of apparatuses, systems, and methods to efficiently and reliably assemble the pulling heads and install them on multi-conductor cabling prior to delivery of the j ob site.

Accordingly, embodiments of the disclosure provided below include a workstation for the installation of pulling head assemblies on multiple conductor cabling and a method for using the same. Because the workstation described in the embodiments incorporates into a single device the tools and components necessary for installing the pulling head assemblies, a reliable, efficient, and reproducible method for installing the pulling head assemblies can be implemented by the manufacture utilizing the workstation. This provides for a reduced cost of installation of the pulling head assemblies, delivery of a consistent quality product to the customer, as well as a safe and efficient working environment for employees.

In the following detailed description, references are made to the accompanying drawings that form a part hereof, and that show, by way of illustration, specific embodiments or examples. The drawings are not drawn to scale. Accordingly, the dimensions or proportions of particular elements, or the relationships between those different elements, as shown in the drawings are chosen only for convenience of description, but do not limit possible implementations of this disclosure. Like numerals represent like elements throughout the several figures.

FIG. 1 shows an exemplary pulling head assembly 100 installed on multiple conductor cabling consisting of four cables or conductors 102A-102D (also referred to herein generally as conductor 102). Any number of conductors 102 may be present in the multi-conductor cabling, and the conductors may be of various diameters and constructed of various materials, depending on the requirements and function of the cabling system when installed. For example, conductors that serve as circuit neutrals, such as the conductor 102D, may be downsized relative to the other conductors 102A-102C that serve as higher-voltage supplies. In addition, the conductors 102 may be insulated or bare. The conductors 102 may be loaded in parallel onto a single reel to be paid off in parallel during the installation of the multi-conductor cabling, or the "pull," at a job site.

A pulling lug or pulling eye 104A-104D (also referred to herein generally as pulling eye 104) is attached to the terminal end of each of the conductors 102A-102D in the multi-conductor cabling. The pulling eyes 104 may be manufactured of any suitable material, including but not limited to aluminum or alloys thereof. Each pulling eye 104 generally has a hollow body portion 106 that engages a bare end of the conductor 102 to affix the pulling eye to the conductor.

As will be described in more detail below in regard to FIGS. 3 and 6, a portion of the insulation of the cable may be removed from the terminal end of the conductor 102 and the terminal end inserted into the hollow body portion 106 of the pulling eye 104. The body portion 106 of the pulling eye 104 may then be crimped, swaged, or otherwise secured to the conductor 102. The dimensions of each pulling eye 104, including the wall thickness and inside-diameter of the hollow body portion 106, may be chosen as appropriate to each conductor 102 to provide a solid crimp. More specifically, the crimp strength may be sufficient to withstand the tension that the conductor 102 is expected to encounter while being pulled into a conduit during the pull.

The method of crimping the pulling eyes 104 to the conductors 102 may, therefore, be important to the reliability of the pulling head assembly installed on the multi-conductor cabling. In one embodiment, the pulling eyes 104 are crimped to the bare end of the conductor 102 in three adjacent positions, with each crimp rotated 90 degrees with respect to the adjacent crimp, as shown in FIG. 1. It will be appreciated that other methods of crimping the pulling eyes 104 to the conductors 102 that provide a secure, reliable connection may also be utilized. In further embodiments, a pulling eye 104 may include a wedging mechanism, set screws, or other mechanical mechanisms operative to secure the body portion 106 to the bare end of the conductor 102.

Each pulling eye 104 is further connected to a pulling cable 108A-108D (also referred to herein generally as pulling cable 108). The pulling cables 108 may be constructed of metallic or non-metallic materials and may be coated or impregnated with a low-friction compound to reduce friction within the conduit during a pull. The opposite ends of the pulling cables 108 may be terminated with a loop, ring, or other means suitable for attaching the pulling cables to one another for pulling the conductors through conduit. The pulling cables 108 may be further connected by a karabiner or clevis 110 to a pulling rope 112 for pulling the conductors 102 through the conduit. In different implementations, a given pulling cable 108 may be attached to more than one pulling eye 104. For example, pulling cables 108B and 108C may be the same pulling cable, with one end attached to the pulling eye 104B and the other end attached to the pulling eye 104C. This may reduce the number of loops passing through the clevis 110.

As shown in FIG. 1, the different pulling cables 108 may be different lengths. These different lengths effectively stagger the pulling eyes 104A-104D within the conduit during the pull, thereby reducing the risk that a pulling eye may jam within the conduit. In contrast, if the pulling cables 108 were the same lengths, the pulling eyes 104A-104D may stack one on top of the other, and if the conduit is sufficiently small in diameter, these stacked pulling eyes may jam when pulled through the conduit. As will be described in more detail below in regard to FIG. 5, each conductor 102 in the multi-conductor cabling may have to be cut to the appropriate length before attaching the pulling eyes 104 in order for the proper staggering of the pulling eyes to result in the final pulling head assembly 100.

The pulling head assembly 100 may further include one or more low-friction (e.g., NYLON, PVC, or any polymeric materials) coverings (not pictured), with these coverings being adapted for placement around each pulling eye 104 and/or the entire pulling head assembly 100 before commencing a given pull. These coverings may conceal any hardware included as part of the pulling head assembly 100 that might contribute to increased friction, thereby reducing the risk that this hardware may contact the conduit through which the conductors are being pulled. The low-friction coverings may also contribute to reducing the force involved with drawing the pulling head assembly through the conduit during the pull.

Figure 2:
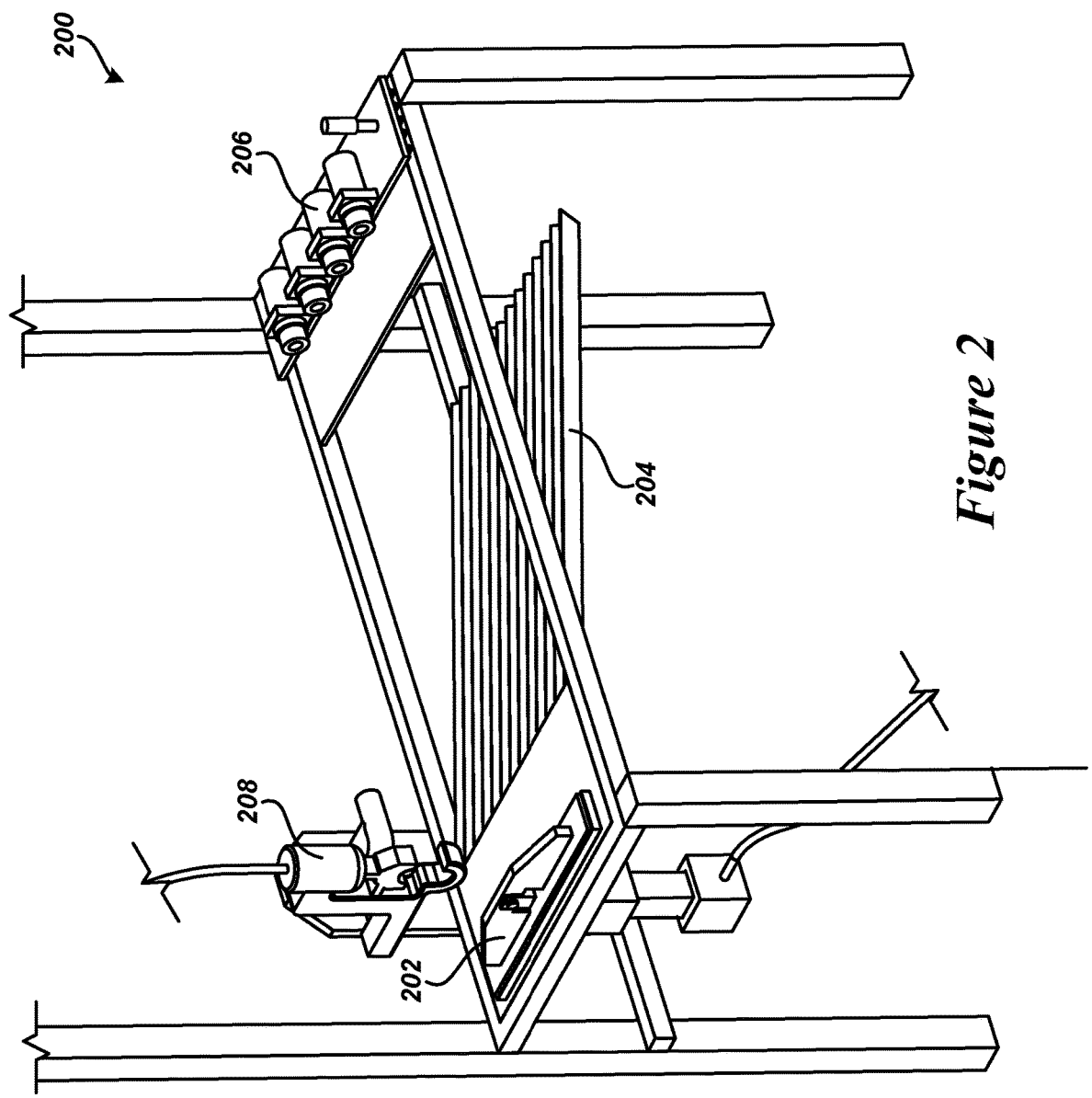
FIG. 2 is a perspective view showing a pulling head assembly workstation for the installation of the pulling head assembly on multiple conductor cabling, according to various embodiments presented herein.

FIG. 2 illustrates a pulling head assembly workstation 200 for the installation of the pulling head assemblies 100 described above onto multiple conductor cabling, according to one embodiment. The workstation 200 incorporates a number of tools and components utilized in the pulling head assembly installation procedure. Each of the tools and components incorporated into the workstation 200 is preconfigured to perform a specific operation in the sequence of operations in the installation procedure. In addition, each tool and component may be positioned so that it is easily accessible to the operator during its use in the installation procedure, but may be moved out of the way for subsequent operations requiring a different tool.

According to embodiments, the workstation 200 may incorporate some or all of a conductor clamp 202, a cutting guide 204, a stripping tool 206, and a crimping tool 208. The conductor clamp 202 may hold each conductor 102 of the multi-conductor cabling in place while the installation of the pulling head assembly 100 is performed. The cutting guide 204 may allow each conductor 102 to be cut to a different length, so that the pulling eyes 104 attached to the ends of each conductor are staggered in the pulling head assembly 100. The stripping tool 206 may remove a portion of the insulation from the terminal end of an insulated conductor 102 to allow the insertion of the end into the body portion 106 of the pulling eye 104, without deforming or damaging the conductor. The crimping tool 208 may be used by an operator to crimp the pulling eyes 104 to the ends of each conductor 102, providing a strong and reliable connection of the conductors to the pulling head assembly 100. These and other tools and components of the workstation 200 will be described in more detail below in regard to FIGS. 3-7B.

FIG. 3 is a side view of the pulling head assembly workstation 200 from the perspective of an operator. As shown in the figure, a number of conductors 102A-102C of a multi-conductor cable may be fed from a cable spool or other delivery device (not shown) into the workstation 200. The conductors 102 are fed under the conductor clamp 202 and into the cutting guide 204. The cable spool or delivery device may provide a mechanism that allows the operator to advance or retreat the cable into and out of the workstation 200 as needed to properly position the conductors 102 in the cutting guide 204. Once the conductors 102 are in position in the cutting guide 204, the conductor clamp 202 is engaged to hold the conductors in place in the workstation 200 during the installation of the pulling head assembly 100.

Figure 4:
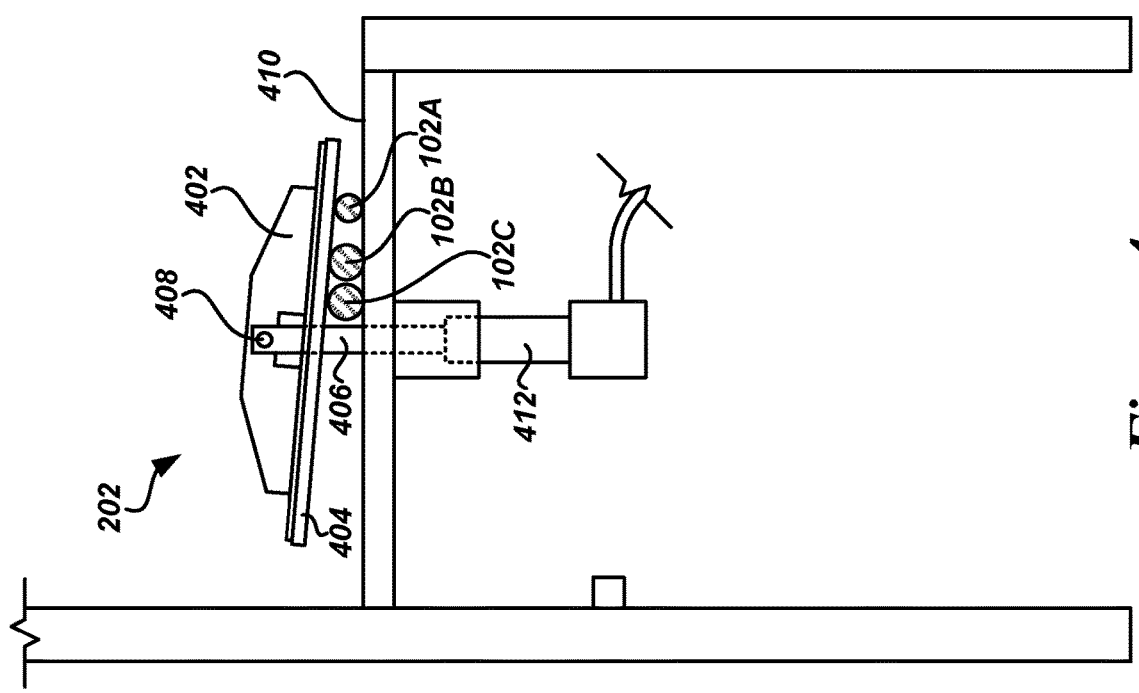
FIG. 4 is an end view of the pulling head assembly workstation showing details of an incorporated conductor clamp, according to various embodiments presented herein.

FIG. 4 is an end view of the pulling head assembly workstation 200 showing additional details of the conductor clamp 202. The conductor clamp 202 consists of a clamp body 402 made of steel or other suitable rigid material. The bottom of the clamp body 402 may have an attached pad 404 made from rubber or other suitable malleable material that allows the conductor clamp 202 to securely hold the conductors 102 in place without damaging or deforming the conductors. The clamp body 402 and attached pad 404 may extend the width of the cutting guide 204 so that the conductor clamp 202 may secure as many conductors as is supported by the workstation 200. The clamp body 402 is attached to a shaft 406 that extends through a top surface 410 of the workstation 200 to a hydraulic piston cylinder 412 mounted below the surface. The operator can engage and disengage the conductor clamp 202 by operating a remote control mechanism (not pictured) that raises and lowers the clamp body 402 by way of the hydraulic piston cylinder 412. The control mechanism may be a lever on a conveniently located control panel or it may be a foot switch located under the operator's position at the workstation 200.

According to one embodiment, the clamp body 402 is attached to the shaft 406 by a hinge pin 408. The hinge pin 408 allows the clamp body 402 and attached pad 404 to tilt when pulled down by the shaft 406 so as to engage the conductors 102A-102C fed into the workstation 200. The ability of the clamp body 402 and attached pad 404 to tilt may allow the conductor clamp 202 to securely hold multiple conductors of differing diameters, as further depicted in FIG. 4. In another embodiment, the workstation 200 may be configured to allow the conductor clamp 202 to be horizontally extended from the end of the workstation, as shown in FIG. 3. The workstation 200 may include extendable support arms 304 that support the conductor clamp 202 and allow the clamp to be positioned by the operator at a distance from the end of the workstation. Clamping the conductors 102A-102C at a point away from the end of the workstation 200 may make it easier for the operator to work with higher gauged or solid core conductors that may be less flexible and harder to manipulate during the installation procedure.

As further shown in FIG. 3, the cutting guide 204 may be a plate of steel or other suitable material that supports the conductors 102 during the installation procedure. According to one embodiment, the cutting guide 204 may slope downward as it runs from the top surface 410 of the workstation 200 near the conductor clamp 202 towards the opposite end of the workstation. The sloped cutting guide 204 allows the remaining conductors 102 to lie below the working surface of the workstation 200 and out of the way of cutting, stripping, and crimping operations taking place on one of the conductors at any given time. The sloped cutting guide 204 may also serve to catch the cut ends of conductors 102, the stripped portions of insulation, and other debris generated from the installation operation and direct the debris into a waste container 302 positioned below the workstation 200 at the lower end of the cutting guide.

Figure 5:
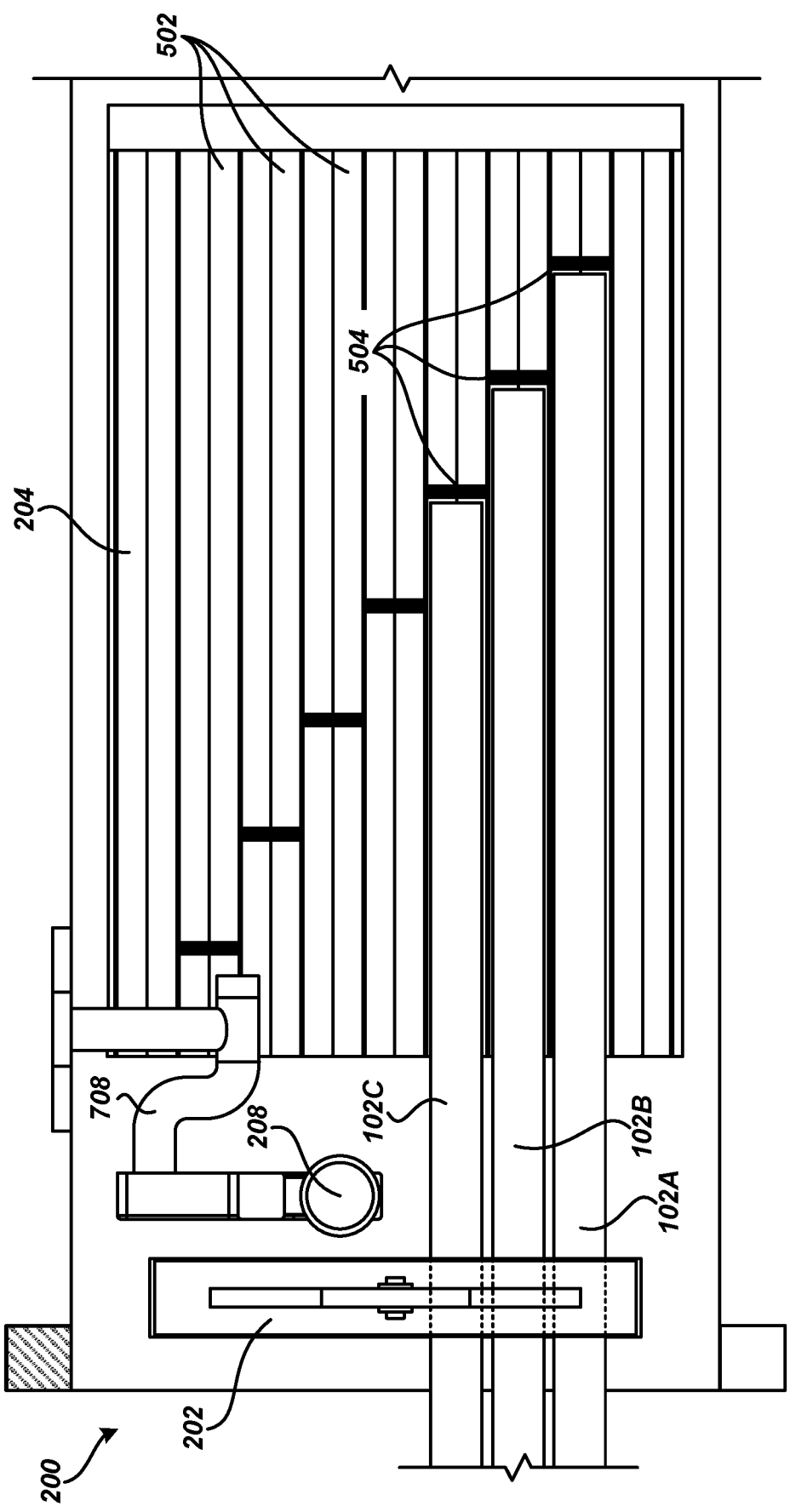
FIG. 5 is a plan view of a portion of the pulling head assembly workstation showing details of an incorporated cutting guide, according to various embodiments presented herein.

FIG. 5 is a plan view of a portion of the pulling head assembly workstation 200 showing additional details of the cutting guide 204. As may be seen in FIG. 5, the cutting guide 204 may contain a number of individual slots or channels 502 that allow the conductors 102A-102C to lay straight and parallel in the cutting guide during the installation procedure. In one embodiment, the cutting guide 204 is marked with indicia marks 504 that indicate the correct length to which to cut the parallel conductors 102 in order to provide the proper staggering of the pulling eyes 104 when the pulling head assembly 100 is installed, as discussed above in regard to FIG. 1. The operator of the workstation 200 may use the indicia marks 504 to mark each of the conductors 102 in the cutting guide 204 to the proper length. It will be appreciated that the operator may use other guides of marking the conductors 102 for cutting, including, but not limited to, a template made from different lengths of PVC pipe or other material, a measuring tape or stick, or the pulling eyes 104 and pulling cables 108 that make up the pulling head assembly 100.

The operator may then cut each of the previously marked conductors to the proper length. A cutting tool (not shown) may also be incorporated into the workstation 200 that allows the operator to cut the conductors 102 without damaging or deforming the terminal ends. This will allow for easier installation of the pulling eyes 104 onto the terminal ends of the conductors 102.

Returning again to FIG. 3, the stripping tool 206 and the crimping tool 208 may be configured to be repositioned horizontally along the length of the workstation 200 by the operator during the installation procedure, according to embodiments. Because the conductors 102 may be cut to varying lengths to accommodate the staggering of the pulling eyes 104 in the pulling head assembly 100, these tools may need to be moved into the proper position depending on the length of the conductor for performing the corresponding operation. For example, in order to strip a portion of the insulation from the terminal end of a previously cut-to-length conductor 102B, the conductor may be lifted from the cutting guide 204, and the stripping tool 206 moved into the proper position with respect to the terminal end of the conductor to perform the stripping operation. Similarly, the crimping tool 208 may be moved horizontally to the proper position to crimp a pulling eye 104 onto the terminal end of a previously cut-to-length and stripped conductor 102C.

Figure 6:
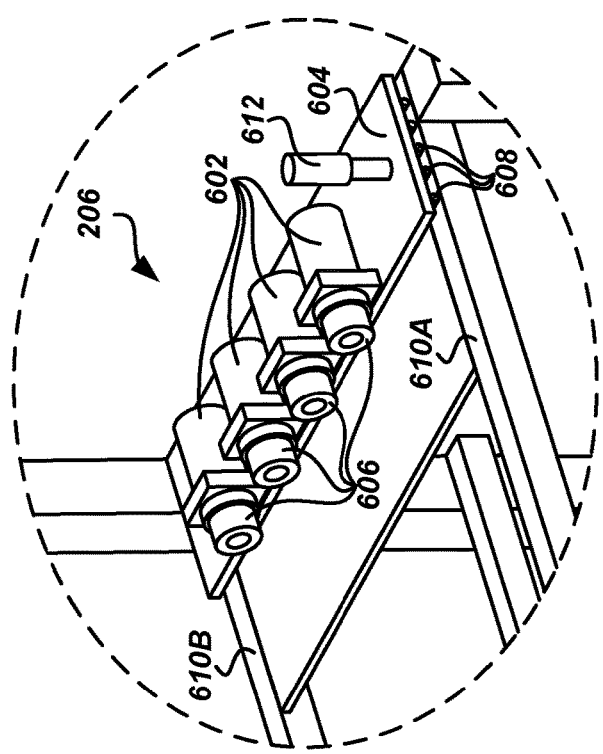
FIG. 6 is a perspective view of a portion of the pulling head assembly workstation showing details of an incorporated stripping tool, according to various embodiments presented herein.

FIG. 6 is a perspective view of a portion of the pulling head assembly workstation 200 showing additional details of the stripping tool 206. The stripping tool 206 may be used by the operator to remove a portion of the insulation from the terminal end of insulated conductors 102 before attaching a pulling eye 104 to the conductor. According to one embodiment, the stripping tool 206 consists of one or more electric drive motors 602 attached to a table 604. A stripping head 606 is installed on each drive motor 602. The stripping heads 606 are each configured to strip a conductor 102 of a different diameter. For example, as shown in FIG. 6, a stripping tool 206 with four drive motors 602 and four stripping heads 606 may be pre-configured to strip the four most often utilized conductor sizes without requiring the operator to change stripping heads. However, if a different size conductor 102 is encountered, the operator may install another stripping head 606 of the appropriate size onto one of the drive motors 602 to continue the stripping operation.

To strip a conductor 102, the operator may first move the table 604 with the attached drive motors 602 horizontally along the workstation 200 so that the terminal end of the previously cut-to-length conductor may be inserted into the appropriate stripping head 606. The table 604 may move along the length of the workstation 200 through the use of slides or rollers 608 installed between the table 604 and the top surface 410 of the workstation 200. The slides or rollers 608 may engage tracks 610A, 610B that run the length of the workstation 200 along either side of the cutting guide 204. A handle 612 may be attached to the table 604 to allow the operator to easily slide the stripping tool 206 in position to perform the stripping operation.

Once the stripping tool 206 is in position, the terminal end of the conductor 102 is inserted into the stripping head 606, and the operator may then engage the drive motor 602 for the stripping head 606 by using a switch mechanism on the control panel or other convenient location. The stripping head 606 may further be configured to engage the terminal end of the conductors 102 and automatically remove the correct amount of insulation required for the installation of the pulling eye 104. Once the stripping operation is complete, the operator may then disengage the drive motor 602 and move the stripping tool 206 in position for stripping another conductor 102, if required.

Figure 7B:
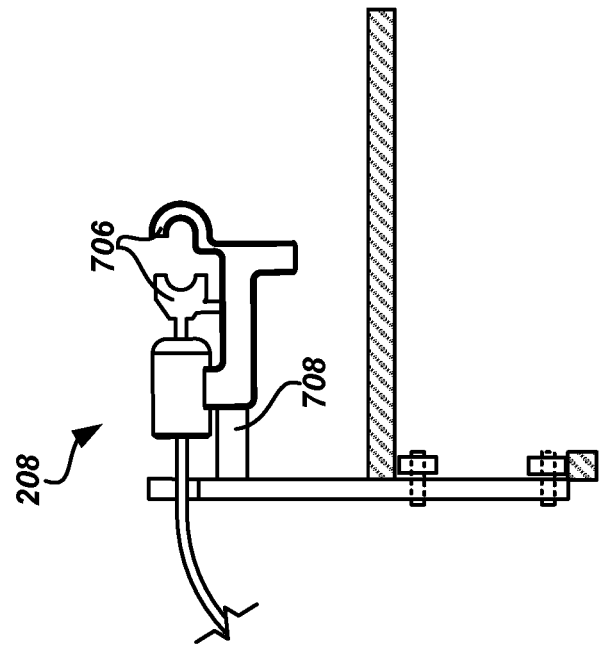
FIGS. 7A and 7B are sectional views of the pulling head assembly workstation showing details of an incorporated crimping tool, according to various embodiments presented herein.
Figure 7A:
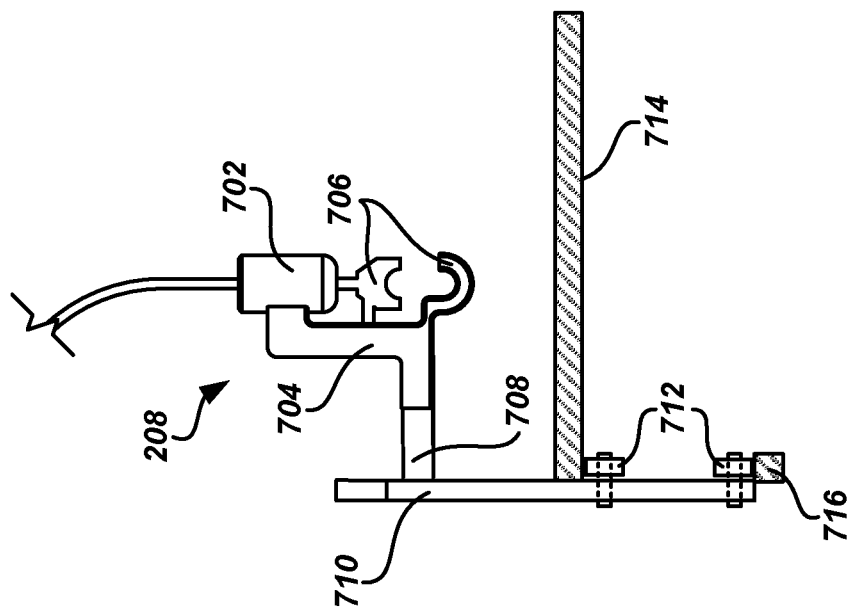

FIGS. 7A and 7B are section views of the pulling head assembly workstation 200 showing additional details of the crimping tool 208. The crimping tool 208 may be used by the operator to crimp the pulling eyes 104 to the conductors 102 during the pulling head assembly 100 installation operation. As shown in FIG. 7A, the crimping tool 208 consists of a hydraulic piston cylinder 702 attached to a body 704 of the tool. The crimping tool 208 has a set of crimping dies 706, one attached to the body 704 and the other attached to a shaft of the piston cylinder 702. Each set of dies 706 may be configured to crimp a pulling eye 104 of a specific diameter. Accordingly, the crimping tool 208 may be configured to allow the operator to easily change the dies 706 in order to accommodate various diameters of conductors 102 and pulling eyes 104 in the pulling head assembly 100. For example, the crimping dies 706 may lie in magnetic holders that keep the dies in position during operation of the crimping tool.

In one embodiment, the crimping tool body 704 is attached to a pivot arm 708, which is further attached to a vertical frame 710. The pivot arm 708 may be constructed of steel tubing or other suitably rigid material. The pivot arm 708 is configured to allow the crimping tool 208 to be rotated 90 degrees, as shown in FIG. 7B. The pivot arm 708 is further configured such that a center point between the crimping dies 706 remains substantially in the same position when the crimping tool 208 is rotated. Additional detail regarding the configuration of the pivot arm is further shown in FIG. 5.

Rotation of the crimping tool 208 via the pivot arm 708 allows the crimping dies 706 to be positioned to perform both vertical and horizontal crimps. For example, the rotation of the crimping tool 208 may be used to crimp a pulling eye 104 to the previously stripped end of a conductor 102 in three adjacent positions, with each crimp rotated 90 degrees with respect to the adjacent crimp, as discussed above in regard to FIG. 1. This provides for a secure and reliable connection between the conductor and the pulling head assembly 100.

The vertical frame 710 may be a steel plate or other rigid vertical member. The vertical frame 710 may be attached to the workstation 200 in such a way that the crimping tool 208 may be moved horizontally to almost any position along the length of the workstation 200. This may allow the crimping tool 208 to be moved into the proper position depending on the cut length of the conductor for performing the crimping operation, as discussed above in regard to FIG. 3. For example, as shown in FIG. 7A, the vertical frame 710 may be attached to the workstation 200 by rollers 712 that engage a bottom surface 714 of the workstation 200 and a support beam 716 running the length of the workstation 200. Other methods of attaching the vertical frame 710 to the workstation 200 may be imagined that allow the crimping tool 208 to be moved horizontally along the length of the workstation 200.

To perform the crimping operation, the operator may first insert the previously stripped terminal end of the conductor 102 into the hollow body portion 106 of the pulling eye 104. The operator moves the crimping tool 208 into position for the first crimp and places the pulling eye 104 between the crimping dies 706. The operator may then engage the piston cylinder 702, which presses the crimping dies 706 together forming the crimp. The operator may engage the piston cylinder 702 by operating a foot switch located under the operator's position at the workstation 200, or by using another control mechanism. After the first crimp is complete, the operator may utilize the pivot arm 708 to rotate the crimping tool 208 90 degrees and then position the pulling eye 104 and/or crimping tool 208 for the second crimp. For the third crimp, the crimping tool 208 is returned to the first position before performing the crimp.

It will be appreciated that the pulling head assembly workstation 200 may incorporate some or all of the individual tools and components described above. In addition, the workstation 200 may incorporate other tools and components utilized in the installation of the pulling head assembly 100 beyond those described above.

Figure 8:
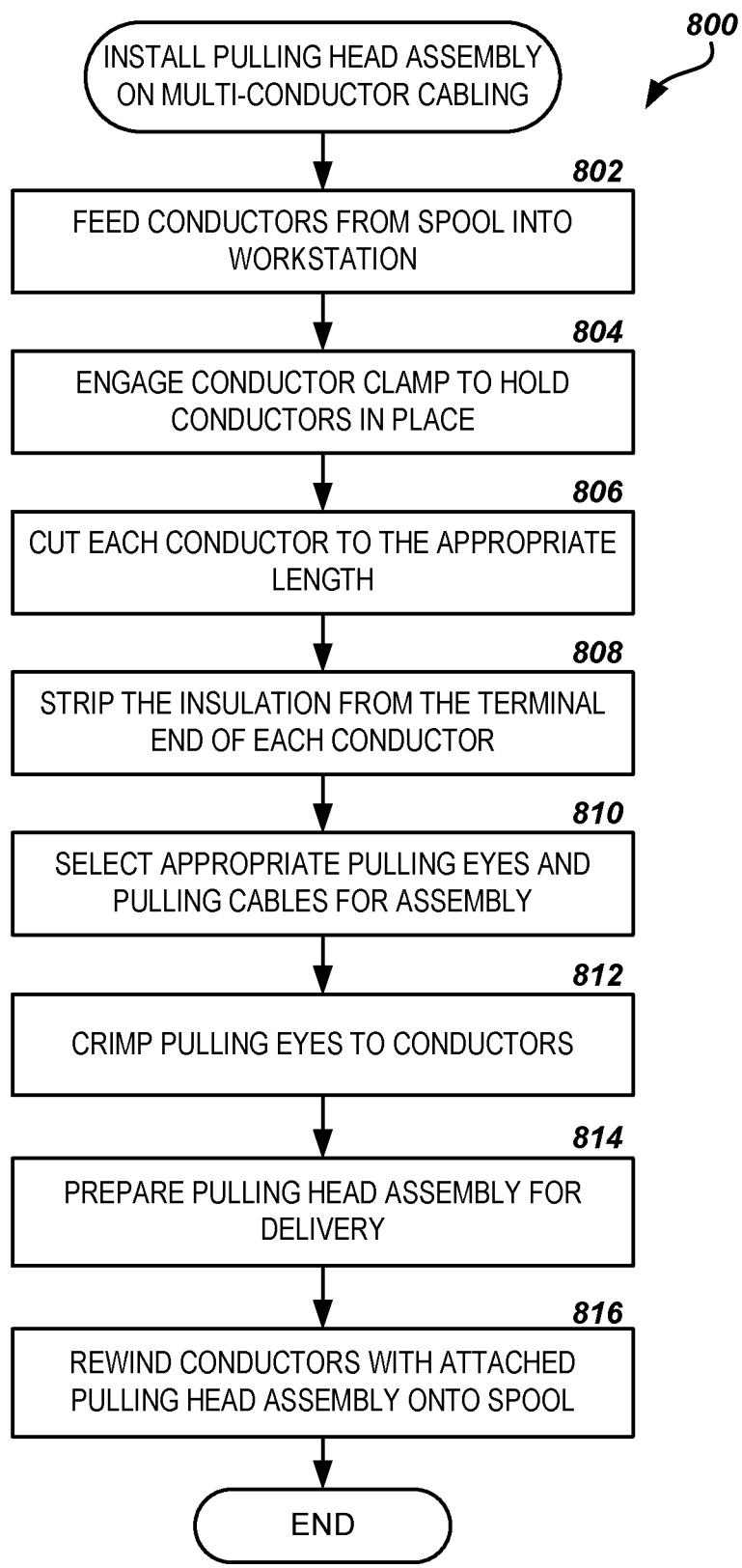
FIG. 8 is a flow diagram illustrating one method of installing a pulling head assembly onto multiple conductor cabling using an apparatus as described in the embodiments presented herein.

FIG. 8 illustrates one routine 800 for installing a pulling head assembly onto multiple conductor cabling utilizing the pulling head assembly workstation 200 described above. It should be appreciated that the operations described below may be performed by one or more operators of the workstation 200 sequentially or in parallel. It should also be appreciated that more or fewer operations may be performed than shown in the figures and described herein, and that the operations may be performed in a different order than described.

The routine 800 begins with operation 802, where the operator takes the conductors 102 of the multi-conductor cabling from a cable spool or other delivery device and feeds them into the workstation 200. The conductors 102 are fed under the conductor clamp 202 and into the cutting guide 204. As discussed above in regard to FIG. 3, the cable spool or delivery device may provide a mechanism that allows the operator to advance or retreat the cable into and out of the workstation 200 as needed to properly position the conductors 102 in the cutting guide 204.

Once the conductors 102 are in position in the cutting guide 204, the routine 800 proceeds from operation 802 to operation 804, where the operator engages the conductor clamp 202 to hold the conductors in place in the workstation 200 during the remainder of the installation procedure. The operator may engage the conductor clamp 202 by operating a remote control mechanism that lowers the clamp body 402 by way of the hydraulic piston cylinder 412 such that the conductors 102 are held securely between the attached pad 404 and the top surface 410 of the workstation.

From operation 804, the routine 800 proceeds to operation 806, where the operator cuts each conductor 102 to the appropriate length to ensure the proper staggering of the pulling eyes 104 in the final pulling head assembly 100, as discussed above in regard to FIG. 1. The operator may use the indicia marks 504 on the cutting guide 204 to mark the conductors 102. The operator may then cut each conductor 102 to the proper length as marked. As discussed above in regard to FIG. 5, a cutting tool may be incorporated into the workstation 200 that may be used by the operator to cut the conductors 102. The cutting tool may be preconfigured to cut the various types and diameters of conductors 102 without damaging or deforming the terminal ends. This will allow for easier installation of the pulling eyes 104 onto the terminal ends of the conductors 102.

The routine 800 then proceeds from operation 806 to operation 808, where the operator utilizes the stripping tool 206 to remove a portion of the insulation from the terminal end of each insulated conductor 102. The operator may first ensure that one of the stripping heads 606 currently attached to the driver motors 602 is the proper size for stripping the conductor 102. If not, the operator may install the appropriate stripping head 606 on one of the drive motors 602. The operator may then lift the conductor 102 from the cutting guide 204 and move the stripping tool 206 horizontally along the workstation 200 into the proper position with respect to the terminal end of the conductor to perform the stripping operation.

The operator then inserts the terminal end of the conductor 102 into the appropriate stripping head 606 and engages the corresponding drive motor 602. As discussed above in regard to FIG. 6, the operator may engage the drive motor 602 by using a switch mechanism on the control panel or other convenient location. The stripping head 606 may be configured to engage the terminal end of the conductor 102 and automatically remove the correct amount of insulation required for the installation of the pulling eye 104. Once the stripping operation is complete, the operator disengages the drive motor 602. The operator may then repeat the stripping operation for the remainder of the conductors 102.

From operation 808, the routine 800 proceeds to operation 810, where the operator selects the appropriate pulling eyes 104 and pulling cables 108 for assembling the pulling head. The selection of a pulling eye 104 for each conductor may depend on the type, material, and diameter of the conductor, while the selection of the pulling cable 108 may depend on the number of conductors and the pattern of staggering desired in the final pulling head assembly 100. According to one embodiment, the pulling eyes 104 may already be connected to the pulling cables 108. The operator may select from a number of pre-assembled pulling eye 104 and pulling cable 108 combinations of varying size, type, and length. As described above in regard to FIG. 1, some pulling cables 108 may be attached to more than one pulling eye 104.

Next, the routine 800 proceeds from operation 810 to operation 812, where the operator utilizes the crimping tool 208 to crimp each of the selected pulling eyes 104 onto the bare end of the corresponding conductor 102. The operator may first ensure that the proper crimping dies 706 are in place for crimping the pulling eye 104. The operator may then lift the conductor 102 from the cutting guide 204 and insert the previously stripped terminal end of the conductor 102 into the hollow body portion 106 of the pulling eye 104. Next, the operator moves the crimping tool 208 horizontally along the workstation 200 into the proper position for the first crimp and places the pulling eye 104 between the crimping dies 706. The operator then engages the piston cylinder 702, which presses the crimping dies 706 together forming the crimp.

As discussed above in regard to FIGS. 7A and 7B, the operator may engage the piston cylinder 702 by operating a foot switch located under the operator's position at the workstation 200, or by using another control mechanism. After the first crimp is complete, the operator may utilize the pivot arm 708 to rotate the crimping tool 208 90 degrees and then position the pulling eye 104 and/or crimping tool 208 for the second crimp. For the third crimp, the crimping tool 208 is rotated back to the initial position before performing the crimp. The crimping operation is then repeated for each pulling eye 104 and corresponding conductor 102 in the pulling head assembly 100.

From operation 812, the routine 800 proceeds to operation 814, where the operator makes final preparations for delivering the installed pulling head assembly 100 to the jobsite.

This may include installing one or more low-friction coverings around each pulling eye 104 and/or the entire pulling head assembly 100, as discussed above in regard to FIG. 1. This may also include tying the loops of the pulling cables 108 together in order to provide for an easier connection of the entire pulling head assembly 100 to the pulling rope 112 on the jobsite. Once installation of the pulling head assembly 100 is complete, the routine proceeds from operation 814 to operation 816, where the operator releases the conductor clamp 202 and rewinds the ends of the conductors with pulling head assembly 100 installed from the workstation 200 back onto the cable spool or delivery device for delivery to the jobsite. From operation 816, the routine 800 ends.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method comprising:
   receiving a plurality of conductors;
   cutting each of the plurality of conductors to a respective length such that the plurality of conductors are cut in a staggered pattern; and
   crimping a pulling eye onto a terminal end of each of at least a portion of the plurality of conductors using a crimping tool.

2. The method of claim 1, wherein a guide is used when cutting each of the plurality of conductors such that the plurality of conductors are cut in the staggered pattern.

3. The method of claim 2, wherein the guide comprises a plurality of indicia markings.

4. The method of claim 1, further comprising after receiving the plurality of conductors, engaging a clamp to hold each of the plurality of conductors in place.

5. The method of claim 1, further comprising removing, using a stripping tool, a portion of an insulation from the terminal end of at least the portion of the plurality of conductors.

6. The method of claim 5, wherein the stripping tool comprises a plurality of drive motors, each of the plurality of drive motors having a stripping head removably attached that is configured to accommodate a conductor of differing diameter.

7. The method of claim 1, wherein the crimping tool is configured to be rotated 90 degrees such that multiple crimps are made on the pulling eye, wherein the multiple crimps are oriented approximately 90 degrees from each other.

8. The method of claim 1, wherein crimping the pulling eye onto the terminal end of each of at least the portion of the plurality of conductors comprises:
   positioning the crimping tool at a first position on the pulling eye;
   crimping, using the crimping tool, the pulling eye at the first position;
   rotating the crimping tool to a second position on the pulling eye; and
   crimping, using the crimping tool, the pulling eye at the second position, wherein the first position and the second position are rotated from each other.

9. A method comprising:
   cutting each of one or more conductors to a respective length;
   removing, using a stripping tool, a portion of an insulation from a terminal end of each of the one or more conductors having the insulation; and
   crimping a pulling eye onto the terminal end of each of the one or more conductors using a crimping tool, wherein the respective length to which to cut each of the one or more conductors is determined based on achieving a staggered pattern of pulling eyes when the pulling eyes are crimped onto the one or more conductors.

10. The method of claim 9, wherein the staggered pattern of the pulling eyes when the pulling eyes are crimped onto the one or more conductors is achieved using a guide.

11. The method of claim 10, wherein the guide comprises a plurality of indicia markings.

12. The method of claim 9, wherein the stripping tool comprises a plurality of drive motors, each of the plurality of drive motors having a stripping head removably attached that is configured to accommodate a conductor of differing diameter.

13. The method of claim 9, wherein the crimping tool is configured to be rotated 90 degrees such that multiple crimps are made on each of the pulling eyes, wherein the multiple crimps are oriented 90 degrees from each other.

14. The method of claim 9, wherein crimping the pulling eye onto the terminal end of each of the one or more conductors comprises:
   positioning the crimping tool at a first position on the pulling eye;
   crimping, using the crimping tool, the pulling eye at the first position;
   rotating the crimping tool to a second position on the pulling eye; and
   crimping, using the crimping tool, the pulling eye at the second position, wherein the first position and the second position are rotated from each other.

* * * * *